United States Patent [19]

Yang

[11] Patent Number: 4,926,307
[45] Date of Patent: May 15, 1990

[54] POLYPHASE A.C. MOTOR SUPPLIED WITH POWER VIA D.C. POWER SUPPLY

[76] Inventor: Tai-Her Yang, 5-1 Taipin St., Si-Hu Town, Dzan-Hwa, Taiwan

[21] Appl. No.: 101,937

[22] Filed: Sep. 28, 1987

Related U.S. Application Data

[63] Continuation-in-part of Ser. No. 918,984, Oct. 15, 1986, abandoned.

[51] Int. Cl.⁵ .............................................. H02M 5/257
[52] U.S. Cl. ...................................... 363/161; 363/157; 318/809
[58] Field of Search ............ 363/68, 69, 70, 159–165, 363/87, 126; 318/803, 807, 809

[56] References Cited

U.S. PATENT DOCUMENTS

| | | | |
|---|---|---|---|
| 3,777,250 | 12/1973 | Kaeser et al. | 363/161 |
| 3,949,464 | 4/1976 | Walker | 29/606 X |
| 3,991,353 | 11/1976 | Katz et al. | 363/157 X |
| 4,038,592 | 7/1977 | Stummer | 363/161 X |
| 4,105,897 | 8/1978 | Stratton et al. | 363/159 X |
| 4,307,311 | 12/1981 | Grozinger | 310/179 |
| 4,425,539 | 1/1984 | Wills | 318/771 |
| 4,468,726 | 8/1984 | Daigle et al. | 363/161 |
| 4,492,890 | 1/1985 | MacDonald | 310/198 X |
| 4,570,214 | 2/1986 | Tanaka | 363/160 |
| 4,642,747 | 2/1987 | Cho | 363/161 X |

*Primary Examiner*—Peter S. Wong
*Assistant Examiner*—Kristine Peckman
*Attorney, Agent, or Firm*—Leonard Bloom

[57] ABSTRACT

An electric motor having a rotor, a stator and a plurality of windings on the stator is provided with power, via a plurality of rectifiers, from an a.c. polyphase source. The rectifier means are coupled between individual ones of the plurality of windings and respective individual ones of the a.c. polyphase source. The rectifier means may be full-wave or half-wave rectifiers. The rectifiers may be diodes, SCR's, TRIACS or the like. The windings are wound on the stator with substantially equal angular distribution. The winding may have a concentric and/or overlapping relationship. High and low (half) speed operation may be affected, using a plurality of switches.

3 Claims, 19 Drawing Sheets

| | A OUTPUT | B OUTPUT | C OUTPUT | |
|---|---|---|---|---|
| T1 (0°) | 0 | 0 | $\sqrt{3}/2$ |  |
| T2 (60°) | 0 | $\sqrt{3}/2$ | 0 |  |
| T3 (120°) | $\sqrt{3}/2$ | 0 | 0 |  |
| T4 (180°) | 0 | 0 | $\sqrt{3}/2$ |  |
| T5 (240°) | 0 | $\sqrt{3}/2$ | 0 |  |
| T6 (300°) | $\sqrt{3}/2$ | 0 | 0 |  |
| T7 (0°) | 0 | 0 | $\sqrt{3}/2$ |  |
| T8 (60°) | 0 | $\sqrt{3}/2$ | 0 |  |
| T9 (120°) | $\sqrt{3}/2$ | 0 | 0 |  |

| | A OUTPUT | B OUTPUT | C OUTPUT | |
|---|---|---|---|---|
| $T_1$ (0°) | 0 | $\sqrt{3}/2$ | $\sqrt{3}/2$ | |
| $T_2$ (60°) | $\sqrt{3}/2$ | $\sqrt{3}/2$ | 0 | |
| $T_3$ (120°) | $\sqrt{3}/2$ | 0 | $\sqrt{3}/2$ | |
| $T_4$ (180°) | 0 | $\sqrt{3}/2$ | $\sqrt{3}/2$ | |
| $T_5$ (240°) | $\sqrt{3}/2$ | $\sqrt{3}/2$ | 0 | |
| $T_6$ (300°) | $\sqrt{3}/2$ | 0 | $\sqrt{3}/2$ | |
| $T_7$ (0°) | 0 | $\sqrt{3}/2$ | $\sqrt{3}/2$ | |
| $T_8$ (60°) | $\sqrt{3}/2$ | $\sqrt{3}/2$ | 0 | |
| $T_9$ (120°) | $\sqrt{3}/2$ | 0 | $\sqrt{3}/2$ | |

Fig. 8

| | A OUTPUT | B OUTPUT | C OUTPUT | |
|---|---|---|---|---|
| T1 (0°) | 0 | $\sqrt{3}/2$ | $\sqrt{3}/2$ |  |
| T2 (30°) | 1/2 | 1 | 1/2 |  |
| T3 (60°) | $\sqrt{3}/2$ | $\sqrt{3}/2$ | 0 |  |
| T4 (90°) | 1 | 1/2 | 1/2 |  |
| T5 (120°) | $\sqrt{3}/2$ | 0 | $\sqrt{3}/2$ |  |
| T6 (150°) | 1/2 | 1/2 | 1 |  |
| T7 (180°) | 0 | $\sqrt{3}/2$ | $\sqrt{3}/2$ |  |
| T8 (210°) | 1/2 | 1 | 1/2 |  |
| T9 (240°) | $\sqrt{3}/2$ | $\sqrt{3}/2$ | 0 |  |
| T10 (270°) | 1 | 1/2 | 1/2 |  |
| T11 (300°) | $\sqrt{3}/2$ | 0 | $\sqrt{3}/2$ |  |
| T12 (330°) | 1/2 | 1/2 | 1 |  |
| T13 (0°) | 0 | $\sqrt{3}/2$ | $\sqrt{3}/2$ |  |
| T14 (30°) | 1/2 | 1 | 1/2 |  |

|  | A OUTPUT | B OUTPUT | C OUTPUT | |
|---|---|---|---|---|
| T1 (0°) | 0 | 0 | √3/2 | |
| T2 (60°) | 0 | 0 | 0 | |
| T3 (120°) | √3/2 | 0 | 0 | |
| T4 (180°) | 0 | 0 | 0 | |
| T5 (240°) | 0 | √3/2 | 0 | |
| T6 (300°) | 0 | 0 | 0 | |
| T7 (0°) | 0 | 0 | √3/2 | |
| T8 (60°) | 0 | 0 | 0 | |
| T9 (120°) | √3/2 | 0 | 0 | |

Fig. 12

| | A OUTPUT | B OUTPUT | C OUTPUT | |
|---|---|---|---|---|
| T1 (0°) | 0 | 0 | $\sqrt{3}/2$ |  |
| T2 (60°) | $\sqrt{3}/2$ | 0 | 0 |  |
| T3 (120°) | $\sqrt{3}/2$ | 0 | 0 |  |
| T4 (180°) | 0 | $\sqrt{3}/2$ | 0 |  |
| T5 (240°) | 0 | $\sqrt{3}/2$ | 0 |  |
| T6 (300°) | 0 | 0 | $\sqrt{3}/2$ |  |
| T7 (0°) | 0 | 0 | $\sqrt{3}/2$ |  |
| T8 (60°) | $\sqrt{3}/2$ | 0 | 0 |  |
| T9 (120°) | $\sqrt{3}/2$ | 0 | 0 |  |

| | A OUTPUT | B OUTPUT | C OUTPUT | |
|---|---|---|---|---|
| T1 (0°) | 0 | 0 | $\sqrt{3}/2$ |  |
| T2 (30°) | 1/2 | 0 | 1/2 |  |
| T3 (60°) | $\sqrt{3}/2$ | 0 | 0 |  |
| T4 (90°) | 1 | 0 | 0 |  |
| T5 (120°) | $\sqrt{3}/2$ | 0 | 0 |  |
| T6 (150°) | 1/2 | 1/2 | 0 |  |
| T7 (180°) | 0 | $\sqrt{3}/2$ | 0 |  |
| T8 (210°) | 0 | 1 | 0 |  |
| T9 (240°) | 0 | $\sqrt{3}/2$ | 0 |  |
| T10 (270°) | 0 | 1/2 | 1/2 |  |
| T11 (300°) | 0 | 0 | $\sqrt{3}/2$ |  |
| T12 (330°) | 0 | 0 | 1 |  |
| T13 (0°) | 0 | 0 | $\sqrt{3}/2$ |  |
| T14 (30°) | 1/2 | 0 | 1/2 |  |

POLYPHASE A.C. MOTOR SUPPLIED WITH POWER VIA D.C. POWER SUPPLY

CROSS-REFERENCE TO RELATED COPENDING APPLICATION

This application is a continuation-in-part application of the copending application of Tai-Her Yang entitled "Motors and Rectification Circuits Therefor" Ser. No. 918,984, filed on Oct. 15, 1986, now abandoned the disclosure of which is incorporated herein in its entirety by reference.

BACKGROUND OF THE INVENTION

This invention relates to an a.c. electric motor which is supplied with d.c. pulses via full-wave or half-wave rectifier circuits from a polyphase a.c. source. The invention relates, more particularly, to such an electric motor which may be supplied with power via controlled rectifiers.

SUMMARY OF THE INVENTION

An object of the present invention is to provide a circuit suitable for supplying an electric motor with power from a polyphase power source via rectifiers which supply the windings with phase (time) displaced d.c. pulses.

Another object of the present invention is to provide a circuit of the type mentioned above which supplies the electric motor with d.c. pulses supplied via full-wave rectifiers from a polyphase a.c. source.

A further object of the present invention is to provide a circuit of the type mentioned above which supplies the electric motor with d.c. pulses supplied via half-wave rectifiers from a polyphase a.c. source.

The invention can be seen as an electric motor having a rotor, a stator, a plurality of windings on the stator and means for providing input power to the windings on the stator. A plurality of rectifier means are coupled between individual, respective ones of the plurality of windings and individual phases of an a.c. polyphase power source for supplying phase displaced d.c. pulses to individual ones of the windings.

The plurality of rectifier means may comprise a plurality of full-wave rectifiers, one full-wave rectifier being provided between each respective phase of the a.c. power source and corresponding respective windings of the plurality of windings.

Each full-wave rectifier may be a respective diode bridge rectifier.

Each full-wave rectifier may be a respective diode bridge rectifier, the circuit including a respective SCR connected between one output terminal of each respective diode bridge and one terminal of each respective one of the plurality of windings. The other terminal of each respective one of said plurality of windings is connected to the other input terminal of each respective diode bridge.

Each full-wave rectifier may be a bridge, two arms of each of the bridges including a pair of SCR's.

The plurality of rectifier means may comprise respective diode bridges, a respective TRIAC being provided between one output terminal of each respective phase of the polyphase power source and one respective input terminal of each respective one of the plurality of windings.

The plurality of rectifier means may comprise a plurality of half-wave rectifiers, one half-wave rectifier being provided between each respective phase of the power source and a corresponding respective winding of the plurality of windings.

Each of the half-wave rectifiers may be a respective diode.

Each of the half-wave rectifiers may be a respective SCR.

The windings of the plurality of windings are distributed on the stator with substantially uniform angular displacement.

The number of phases may be three, the windings in this case are distributed substantially uniformly by substantially 120° angles.

The windings of the plurality of windings may be wound in concentric overlapping relationship.

The windings of the plurality of windings may be wound in an overlapping relationship which is other than concentric.

The circuit may include a first plurality of switches provided between individual ones of the phase of the polyphase power source and respective individual ones of said rectifier means. A second plurality of switches may be provided between individual ones of the rectifier means and individual ones of the plurality of windings. A third plurality of switches may be provided between individual ones of the phases of the polyphase power source and respective individual ones of the rectifier means. A fourth plurality of switches may be provided between respective individual ones of the rectifier means and respective individual ones of the plurality of windings. The motor operates at one speed when the first and second plurality of switches are closed, while the third and fourth pluralities of switches are open. The motor operates at a speed twice the one speed when the third and fourth plurality of switches are closed and the first and second pluralities of switches are open.

The invention can also be viewed as an electric motor having a rotor, a stator, a pair of windings on the stator and means for providing input power to the windings. A first plurality of rectifier means are individually coupled between one terminal of one of the windings and a first terminal of a respective phase of a polyphase power source. A second plurality of rectifier means are individually coupled between one terminal of the other of the windings and the first terminal of a respective phase of the polyphase power source. A second terminal of each of the windings is connected to a neutral terminal of the polyphase power source.

The pluralities of rectifier means may be respective pluralities of SCR's.

BRIEF DESCRIPTION OF THE DRAWINGS

FIGS. 6, 8, 10, 12, 14 and 16 are tables respectively helpful in understanding the operation of the present invention when considered in conjunction with FIGS. 5, 7, 9, 11, 13 and 15, respectively.

DETAILED DESCRIPTION OF THE PREFERRED EMBODIMENTS

In FIGS. 1A–1G six exemplary embodiments of possible circuits for connecting a polyphase a.c. power source to a plurality of stator windings WA, WB and WC, provided with respective pairs of input terminals U,X and V,Y and W,Z, of an a.c. electric motor in accordance with the present invention are illustrated.

Figure 1A:
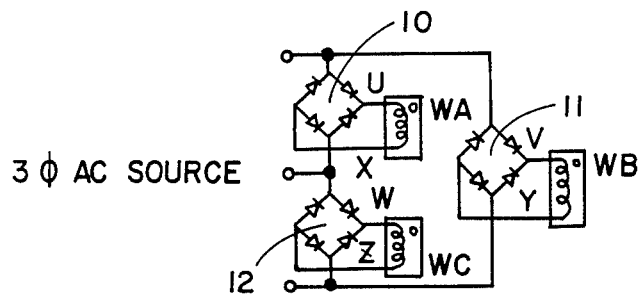
FIGS. 1A–1F are schematic diagrams of six different embodiments of the invention in which d.c. pulses are supplied to windings of an electric motor via full wave and half-wave rectifiers from polyphase a.c. source.
Figure 1G:
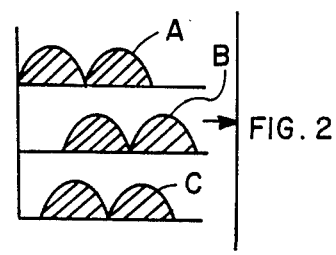
FIGS. 1G–1L are waveform diagrams showing the waveforms of the d.c. pulses applied to the motor windings by the circuits shown in FIGS. 1A–1F respectively adjacent to FIGS. 1G–1L.
Figure 1B:
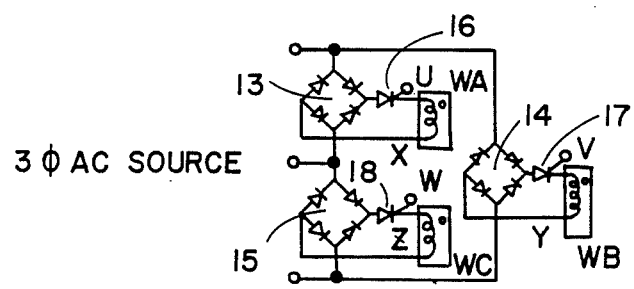
Figure 1H:
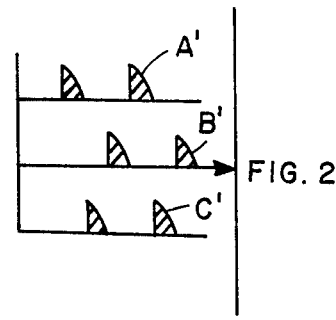
Figure 1C:
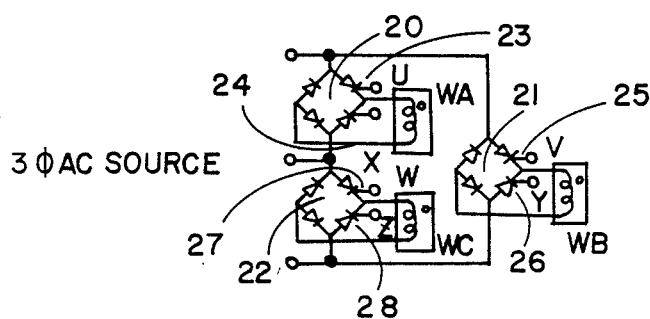
Figure 1I:
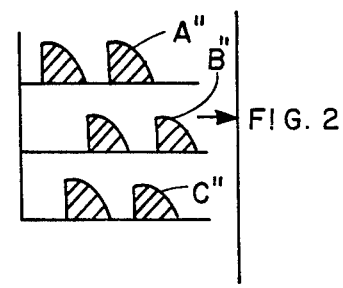
Figure 1D:
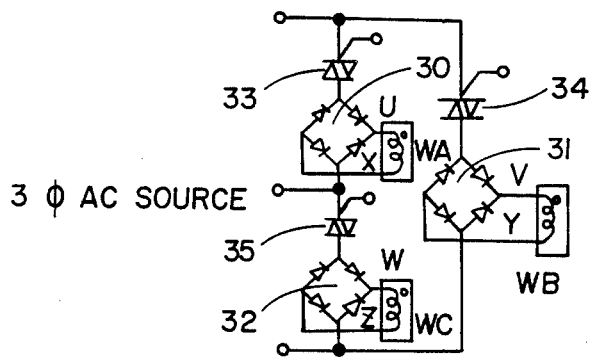
Figure 1J:
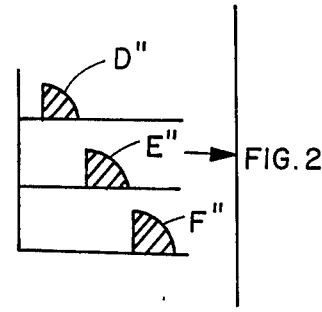
Figure 1E:
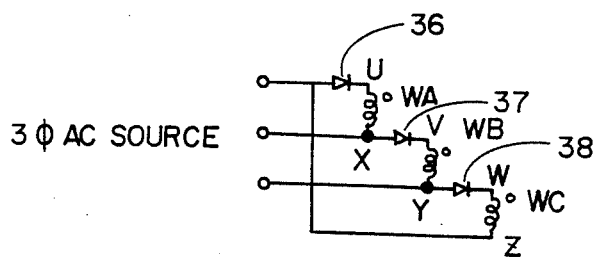

In the first embodiment (FIG. 1A) three respective full-wave rectifying bridges 10–12 are provided, each bridge being connected between a respective one of the three phases of a three phase power source. In the second embodiment (FIG. 1B), the circuit includes three respective full-wave rectifying bridges 13–15, in this case respective SCR's 16–18 are provided between one output terminal of the respective bridges and the respective terminals U,V and W of the stator windings WA, WB and WC, respectively. In the third embodiment (FIG. 1C), three full-wave rectifiers 20–21 are provided. In this case, two arms of each bridge are provided with respective SCR's 23, 24 and 25, 26 and 27, 28 which replace corresponding diodes of the first embodiment. In these full-wave cases, the current to the stator windings take the form of the three idealized waveforms shown respectively in FIGS. 1G–1L. When no SCR's are provided (FIG. 1A), the waveforms take the form of full-wave pulses A–C (FIG. 1G). When the SCR's 16–18 are used (FIG. 1B) the current pulses supplied to the stator windings take the form of idealized waveforms A'–C' (FIG. 1H), the SCR's 16–17 being provided with synchronizing a.c. or d.c. pulse inputs to their respective gate electrodes derived from the respective phases of the polyphase source. When the SCR's 23–28 are used (FIG. 1C) the current pulses supplied to the stator windings take the form of idealized waveforms A''–C'' (FIG. 1I). In the third embodiment (FIG. 1C), as in the second embodiment (FIG. 1B), the gate of the electrodes SCR's 23–28 are provided with synchronizing a.c. or d.c. pulse inputs derived from the respective phases of the three-phase source. The actual firing angle in the second and third embodiments can be set by selecting the phase shift or time delay provided by the synchronizing circuits.

Figure 1K:
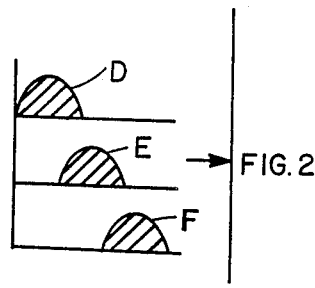
Figure 1F:
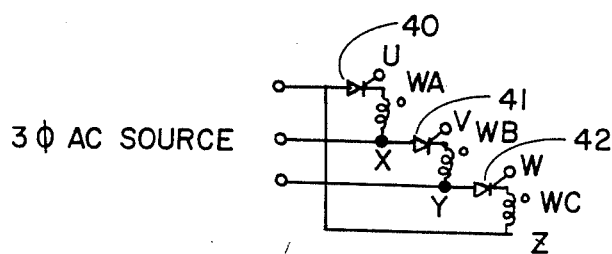
Figure 1L:
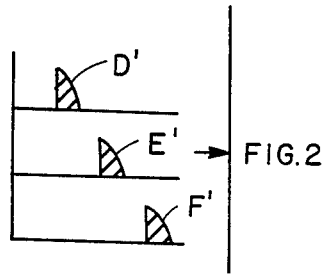

In the fourth embodiment, (FIG. 1D), respective rectifying bridges 30–32 are provided, their respective outputs being connected across the stator windings WA–WC, respectively. In this case, respective TRIACS 33–35 are provided between the respective phases of the three-phase source and the respective bridges 30–32. The firing electrodes of the respective TRIACS 33–35 receive synchronizing a.c. or d.c. pulse inputs derived from respective phases of the three-phase a.c. power source, the circuit providing current pulses of the idealized form shown in the waveforms D''–F'' (FIG. 1J) to the respective stator windings WA–WC. In the fifth embodiment (FIG. 1E), which is a half-wave system, respective rectifying diodes 36–38 are provided between the respective phases of the three-phase source the respective stator windings WA–WC, which receive current pulses of the idealized form illustrated as waveforms D–F (FIG. 1K). In the sixth embodiment (FIG. 1F), which is similar to the fifth embodiment, the diodes are replaced by respective SCR's 40–42, each having gate electrodes which receive synchronizing a.c. or d.c. pulse inputs derived from the three-phase power source. In this case, the current supplied to the stator windings WA–WC have the idealized form illustrated as waveforms D'–F' (FIG. 1L).

Figure 2:
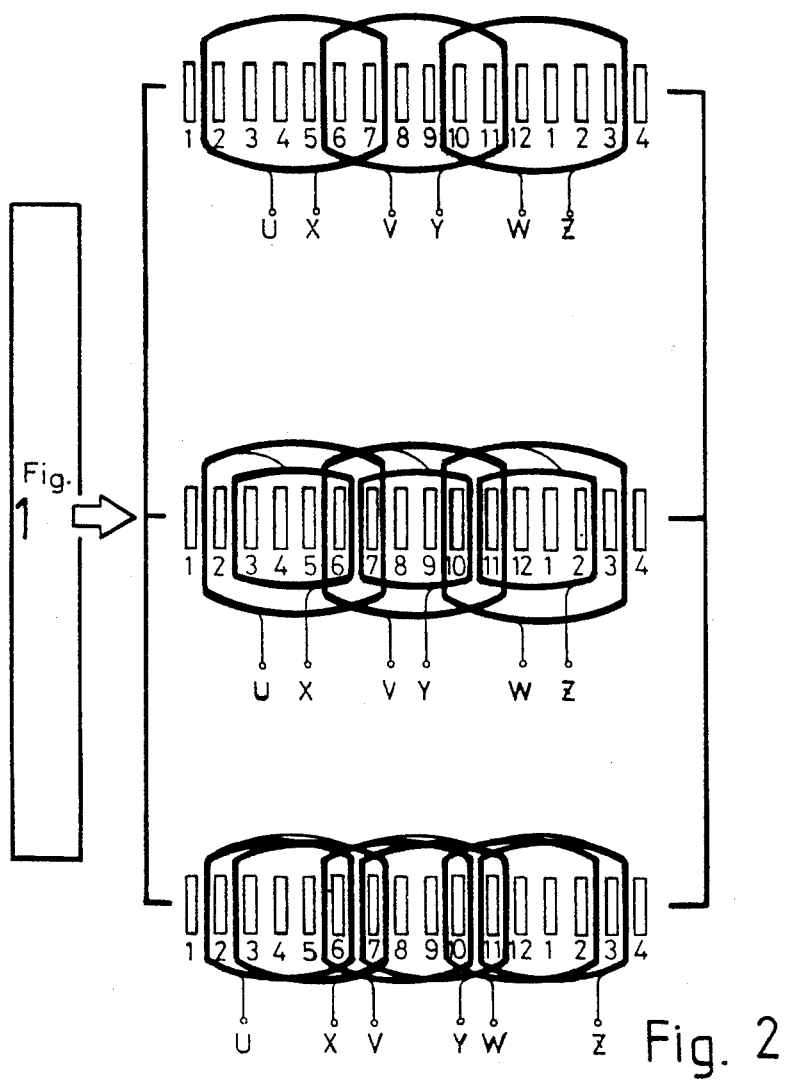
FIG. 2 is a composite schematic drawing of three possible distributions of windings on the stator of an electric motor which may be supplied with d.c. pulses from the rectifier circuits of FIGS. 1A–1F in accordance with the present invention.

The windings WA–WC (FIGS. 1A–1F) are wound in slots and/or about poles on the rotor of an a.c. electric motor. A number of winding patterns may be used. The windings WA–WC may be placed on the stator with substantially uniform displacement of 120°, may be concentric and/or may be wound in a concentric overlapping arrangement, three possibilities being illustrated in FIG. 2 in association with 12 slots, slots 1–4 being repeated to show the whole winding scheme clearly.

The input and output waveforms of the six species illustrated in FIG. 1 are shown respectively in FIGS. 9, 5, 7, 15, 11 and 13 over a 360° a.c. input, FIGS. 10, 6, 8, 16, 12 and 14 being a corresponding tabular representation with the instantaneous position of a rotating North-South field being shown for nine different times $T_1$–$T_9$, the angular notations also being shown in 60° increments.

Figure 3:
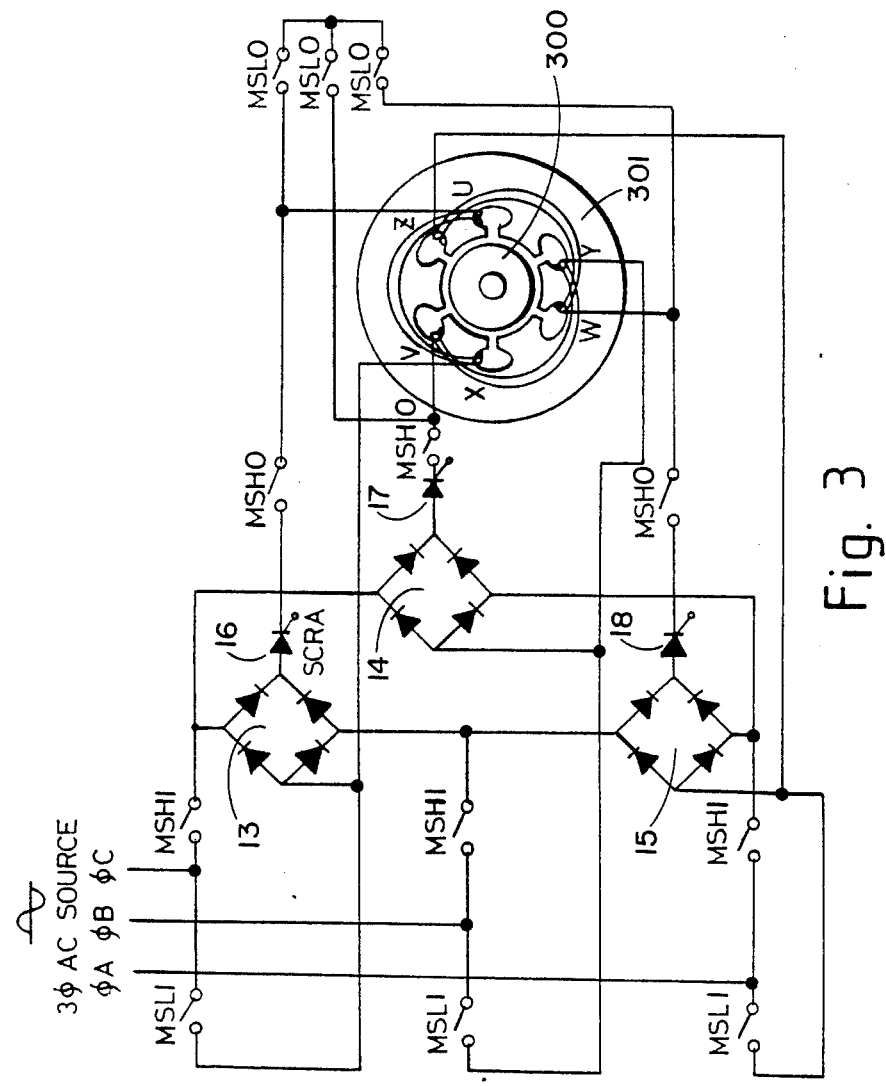
FIG. 3 is a schematic diagram of a circuit for supplying d.c. pulses to windings of an electric motor via rectifiers and switching arrangements from a polyphase a.c. source, allowing low and high speed operation, the rotor and stator of the motor being shown diagrammatically.

Turning now to FIG. 3, a more detailed and preferred version of the second embodiment (FIG. 1B) is illustrated, the rotor 300 and the stator 301 of the a.c. motor being shown in cross-section; as illustrated, multiple a.c. input switches MSL1 and MSH1 are provided and multiple d.c. output-to-winding switches MSL0 and MSH0 are provided. Whenever the MSL1 and MSL0 switches are closed and the MSH1 and MSH0 switches are open the stator 300 runs at a high speed for example, for a two pole motor at a 60 Hz input frequency the speed would be 3600 r.p.m. and for a 50 Hz input frequency, the speed would be 3000 r.p.m. It is to be understood that the preferred variant of the other five species of the present invention shown in (FIGS. 1A and 1C–1F) may be provided with pluralities of switches corresponding to the switches MSL1, MSL0, MSH1 and MSH0 at corresponding circuit positions. Thus, multi-speed electric motors are possible for each of the six embodiments, in the above-mentioned variants.

Figure 4:
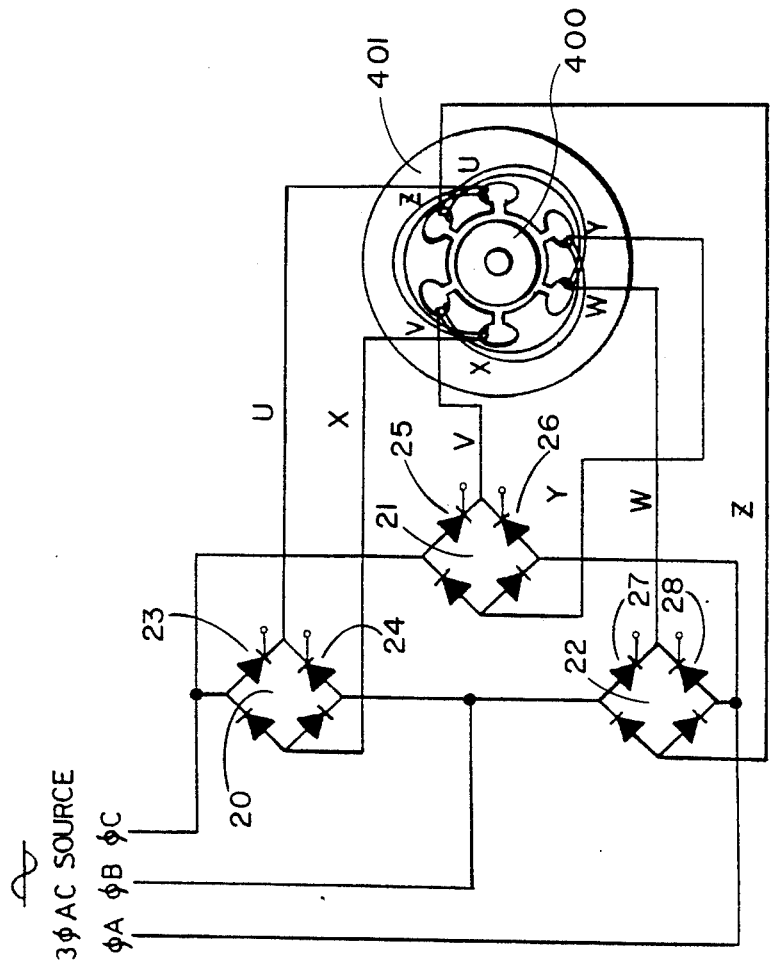
FIG. 4 is a schematic diagram of a circuit for supplying d.c. pulses to windings of a motor via SCR's, the rotor and stator of the motor being shown diagrammatically.
Figure 5:
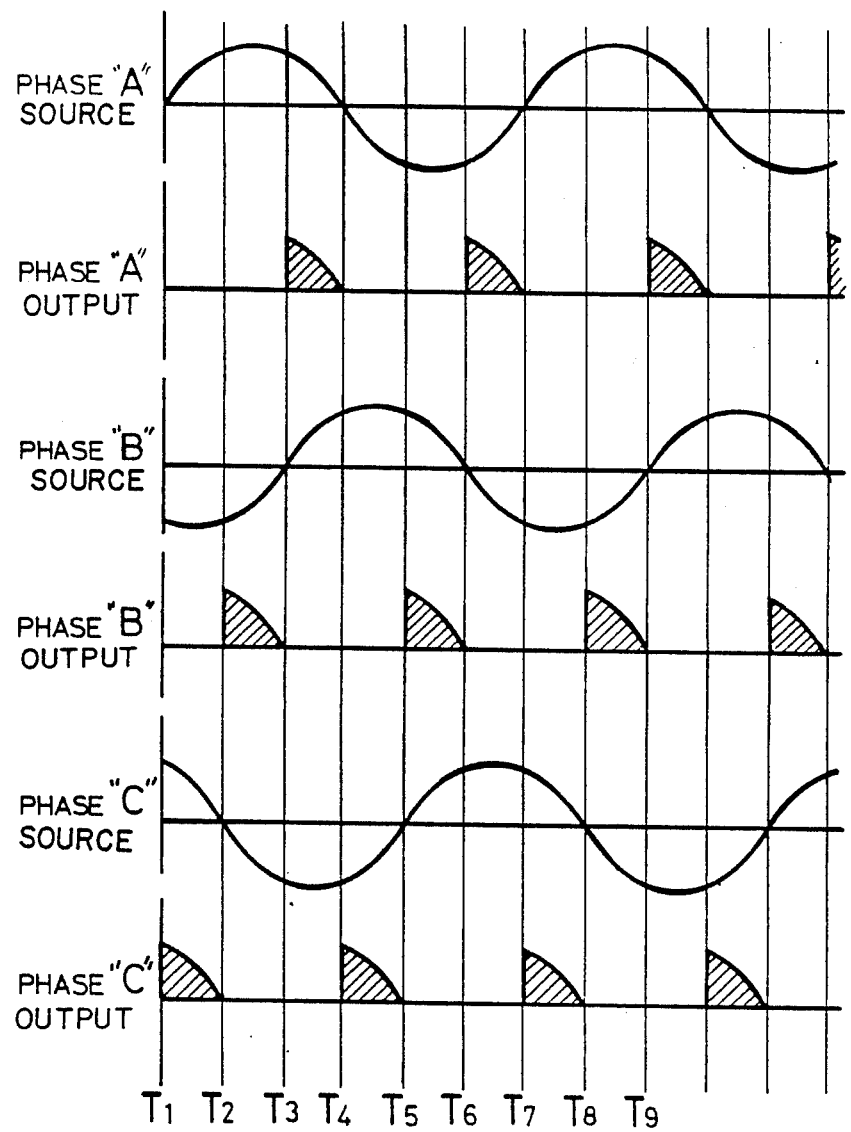
FIGS. 5, 7, 9, 11, 13 and 15 are respective graphic illustrations showing an input and output waveforms to and from controlled rectifiers against time useful in understanding the operation of the present invention.
Figure 6:
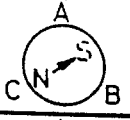
Figure 6:
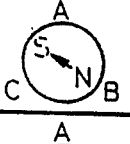
Figure 6:
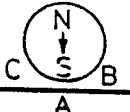
Figure 6:
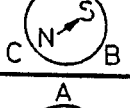
Figure 6:
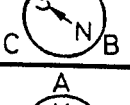
Figure 6:
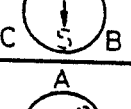
Figure 6:
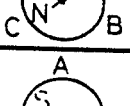
Figure 6:
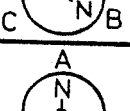
Figure 6:
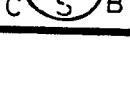
Figure 7:
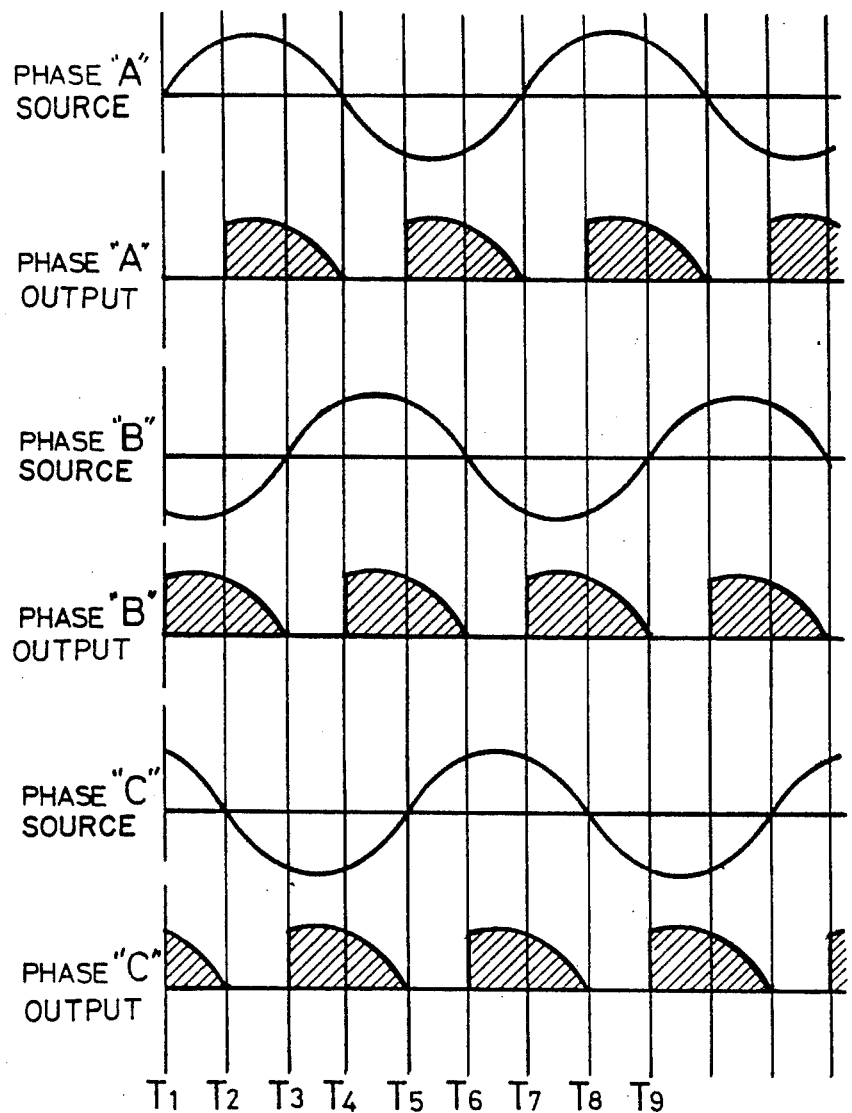
Figure 9:
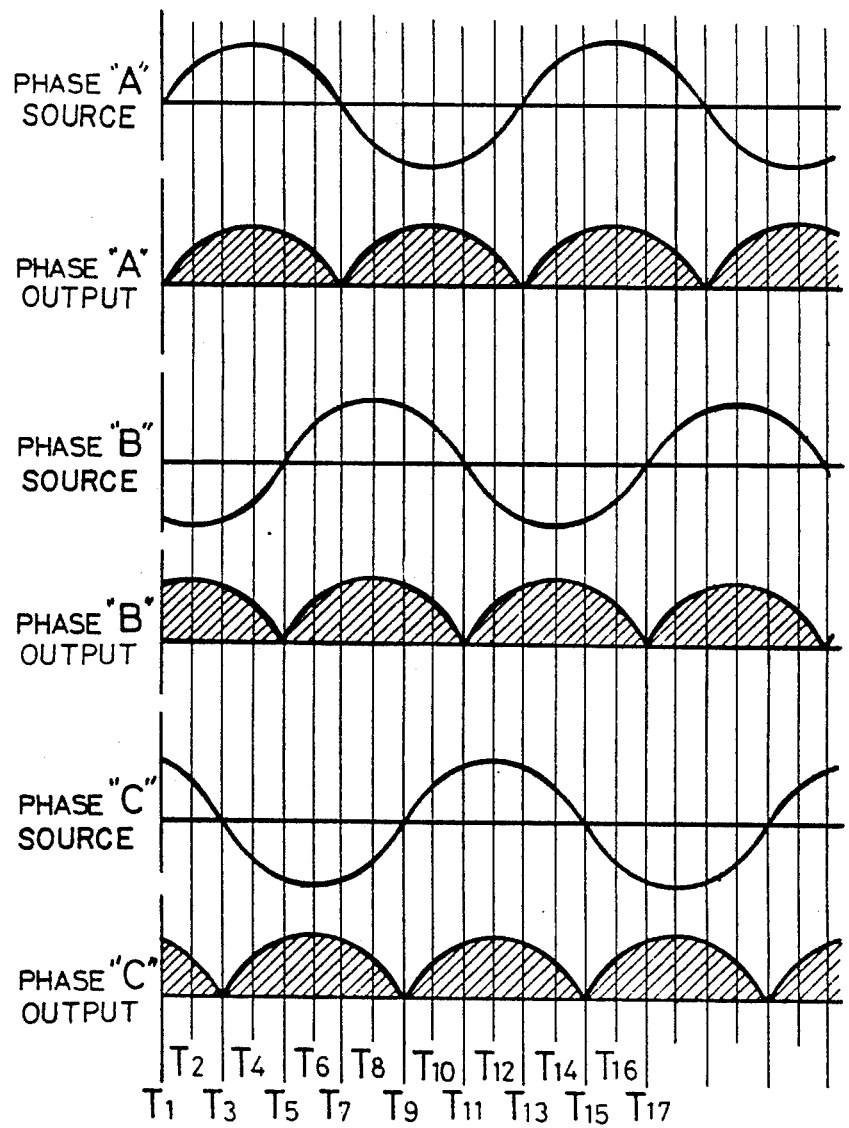
Figure 10:
Figure 10:
Figure 10:
Figure 10:
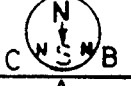
Figure 10:
Figure 10:
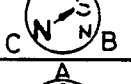
Figure 10:
Figure 10:
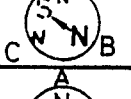
Figure 10:
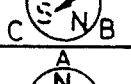
Figure 10:
Figure 10:
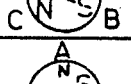
Figure 10:
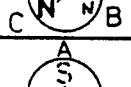
Figure 10:
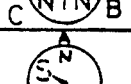
Figure 10:
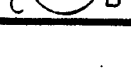
Figure 11:
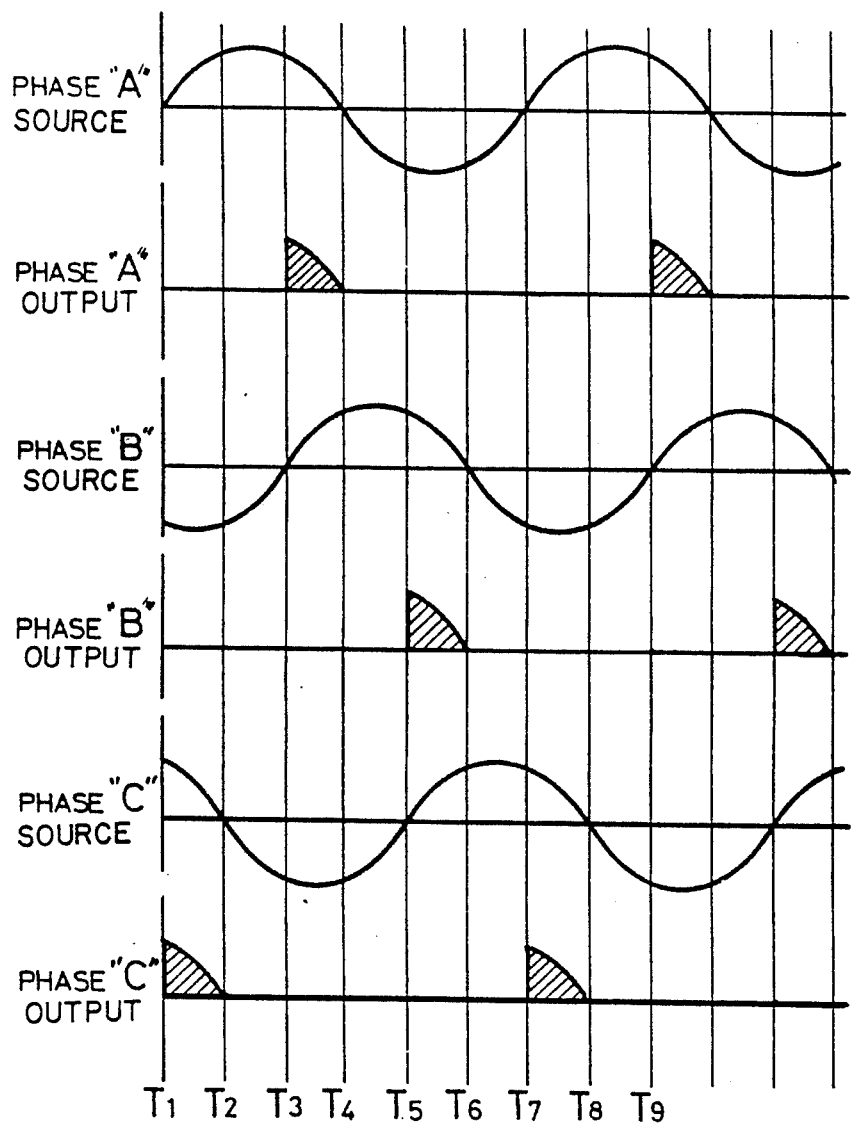
Figure 13:
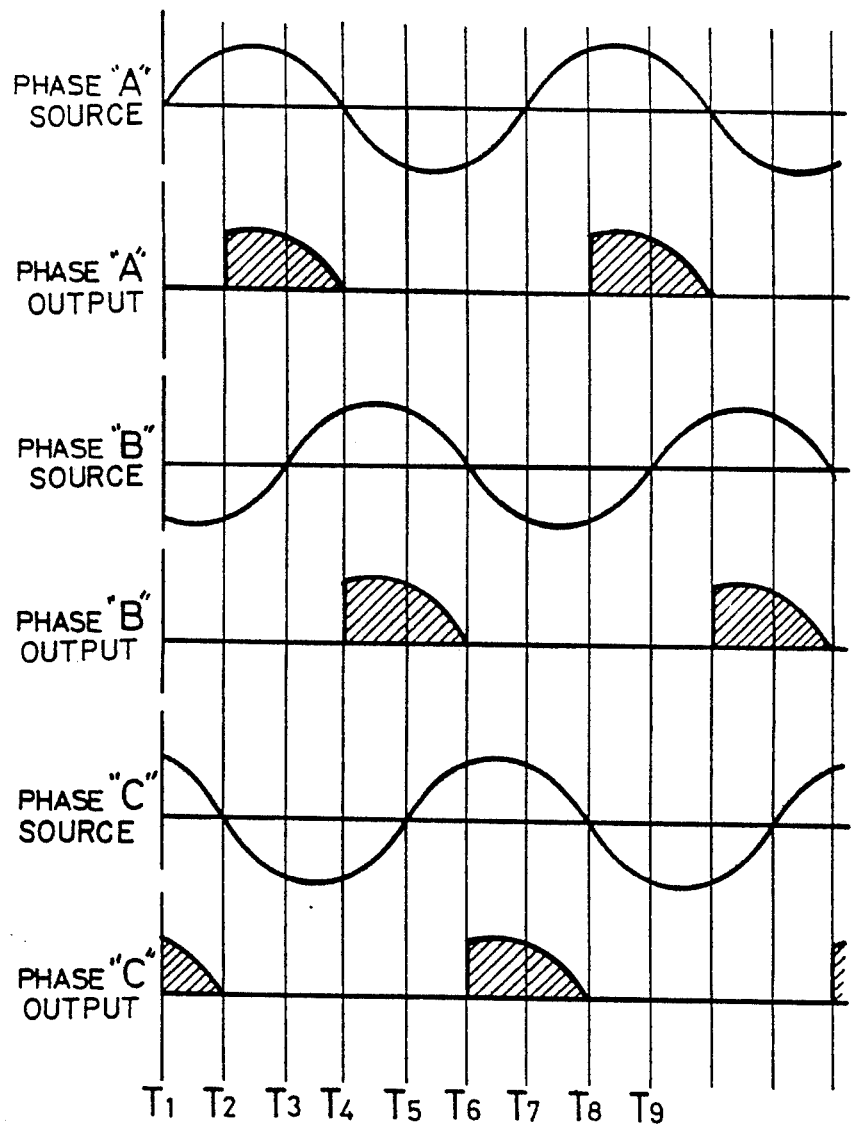
Figure 14:
Figure 14:
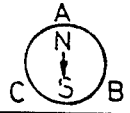
Figure 14:
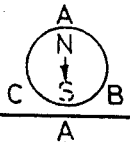
Figure 14:
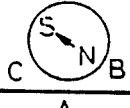
Figure 14:
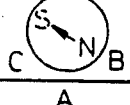
Figure 14:
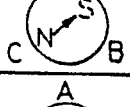
Figure 14:
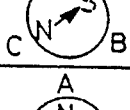
Figure 14:
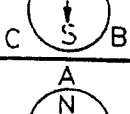
Figure 14:
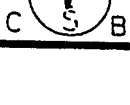
Figure 15:
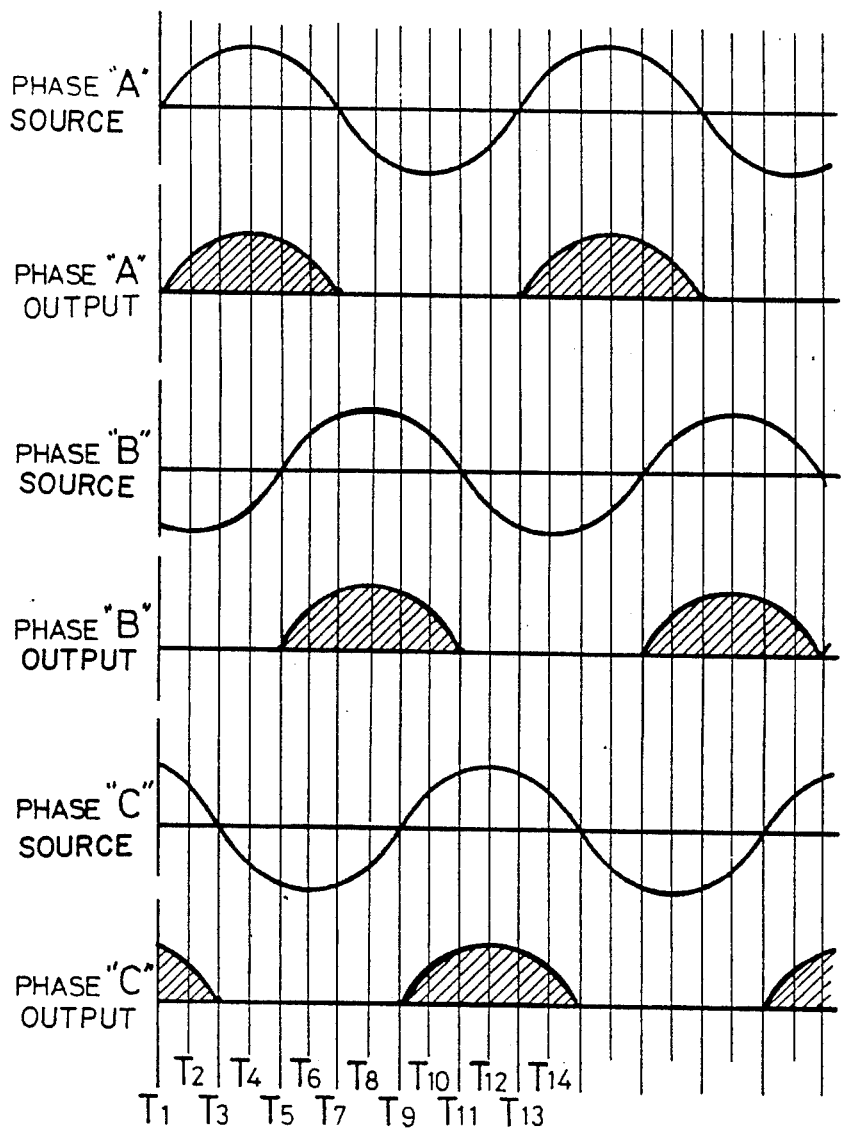
Figure 16:
Figure 16:
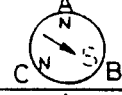
Figure 16:
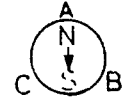
Figure 16:
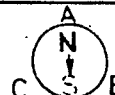
Figure 16:
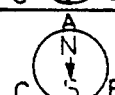
Figure 16:
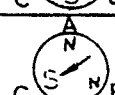
Figure 16:
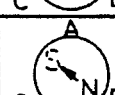
Figure 16:
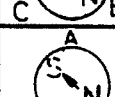
Figure 16:
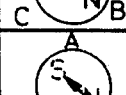
Figure 16:
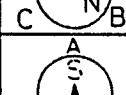
Figure 16:
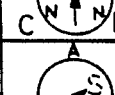
Figure 16:
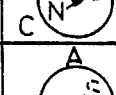
Figure 16:
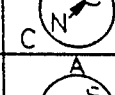
Figure 16:
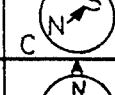

The third embodiment of the invention of (FIG. 1C) is illustrated in more detail in FIG. 4, the rotor 400 and the stator 401 being shown in cross-section with the stator windings thereon.

Figure 17:
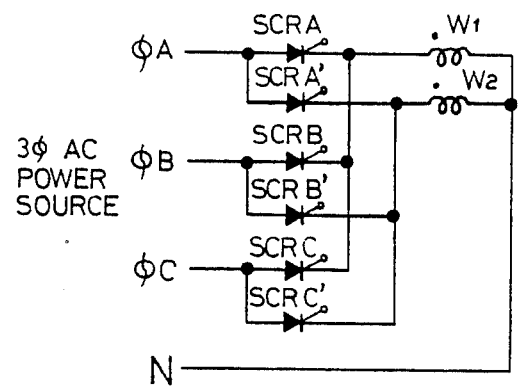
FIG. 17 is a schematic diagram of a circuit for supplying d.c. pulses to a pair of windings of an electric motor via SCR's from a three-phase power source.
Figure 18:
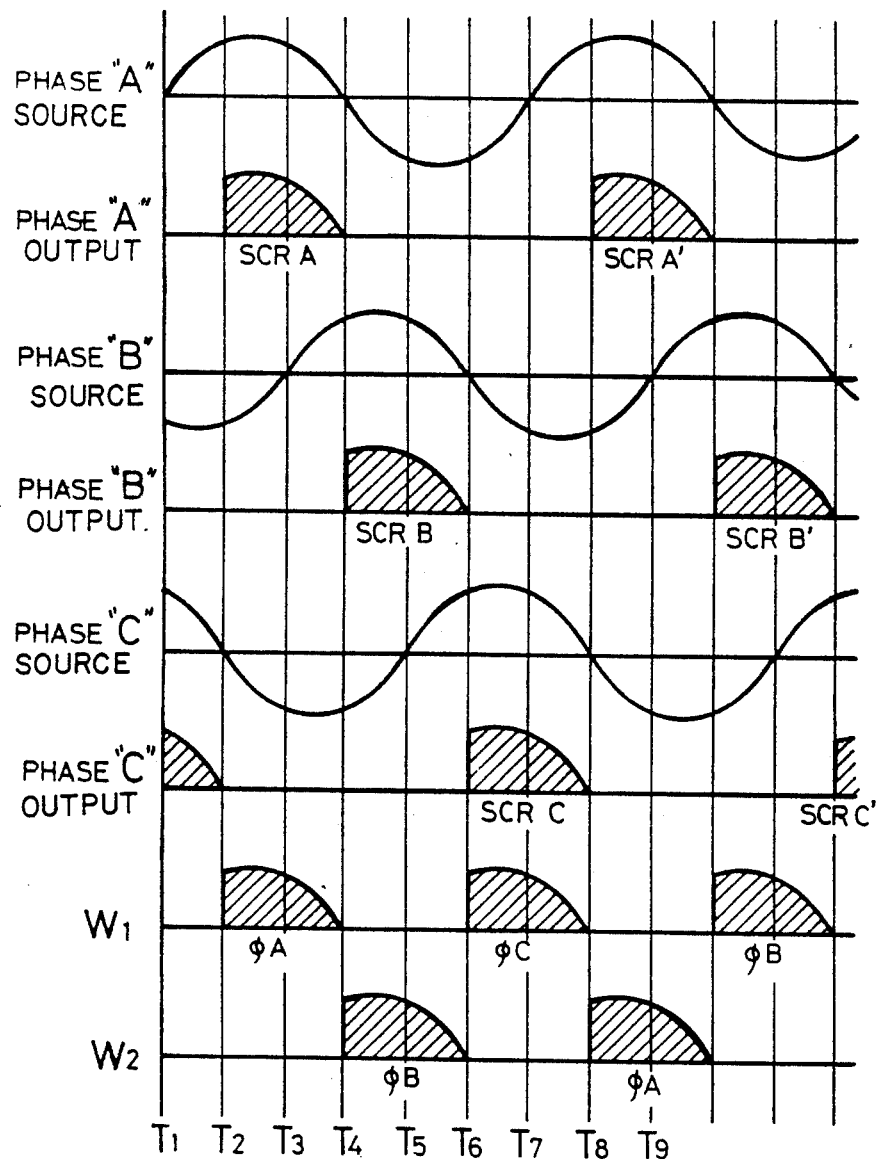
FIG. 18 is a graphic illustration showing input and output waveforms to the SCR's in the circuit of FIG. 18 against time useful in understanding the operation thereof.

FIG. 17 is a schematic circuit diagram of a seventh embodiment of a circuit for supplying an electric motor with power from a polyphase, shown as a three-phase a.c. power source, only two windings W1 and W2 being provided. These windings are provided on a stator (not shown). One terminal of each of the phases of the three-phase a.c. source is coupled to one respective terminal of each of the windings W1 and W2 via respective SCR's designated respectively as SCRA, SCRB, SCRC and SCRA', SCRB', SCRC'. The gate electrodes of the SCR's receive appropriate a.c. or d.c. pulse synchronizing signals derived from the three-phase power source or one of the phases thereof. The firing angles of the SCR's are selected so that current pulses corresponding to the idealized pulses shown as phase outputs in FIG. 18 take place and the rotor (not illustrated) rotates.

The a.c. electric motors may be a conventional synchronous motor (including a step motor) or an asynchronous motor (such as an inductive cage motor, a wound rotor motor or a magnetic hysteresis motor or the like).

It is to be understood that the foregoing text and accompanying drawing figures have been set out by way of illustration, not by way of limitation. Numerous other embodiments and variants are possible without departing from the spirit and scope of the present invention, its scope being defined in the appended claims.

What is claimed is:

1. In a three phase electric motor having a rotor, a stator, three individual windings on the stator, each of said windings having a start end and a finish end, and means including first, second and third input lines for providing three phase input power to the windings on the stator, first, second and third rectifier bridges coupled between individual, respective ones of said three windings and separate pairs of said input lines;

each of said rectifier bridges having first, second, third and fourth rectifier devices, each of said rectifier devices having an anode and a cathode;

in each of said bridges, the anode of said first device and the cathode of said fourth device being connected together to form a first bridge input terminal, the anode of said second device and the cathode of said third device being connected together to form a second bridge input terminal, the cathodes of said first and second devices being connected together to form a first bridge output terminal, the anodes of said third and fourth devices being connected together to form a second bridge output terminal;

said first one of said input lines being connected to said first input terminal of said first bridge;

said second one of said input lines being connected to said second input terminal of said first bridge;

said start end of a first one of said windings being connected to said first output terminal of said first bridge;

said finish end of said first winding being connected to said second output terminal of said first bridge;

said first one of said input lines being also connected to said first input terminal of said second bridge;

said third one of said input lines being connected to said second input terminal of said second bridge;

said start end of a second one of said windings being connected to said first output terminal of said second bridge;

said finish end of said second winding being connected to said second output terminal of said second bridge;

said second input line being also connected to said first input terminal of said third bridge;

said third input line being also connected to said second input terminal of said third bridge;

said start end of a third one of said windings being connected to said first output terminal of said third bridge; and said finish end of said third winding being connected to said second output terminal of said third bridge.

2. A motor as claimed in claim 1 wherein each said first and second rectifying devices of each said bridge is comprised by a silicon controlled rectifier (SCR), each said SCR having anode, cathode and gate electrodes.

3. A motor as claimed in claim 1, with additionally:

three individual silicon controlled rectifiers (SCRs), each said SCR having anode, cathode and gate electrodes, one each of said SCRs being interposed between said first output terminal of a separate one of said bridges and the start end of that one of said windings associated with that respective bridge, the anode of each said SCR being connected to said first output terminal of each said respective one of said bridges, the cathode of each said SCR being connected to said start end of said winding associated with that respective one of said bridges.

* * * * *